Figure 1:
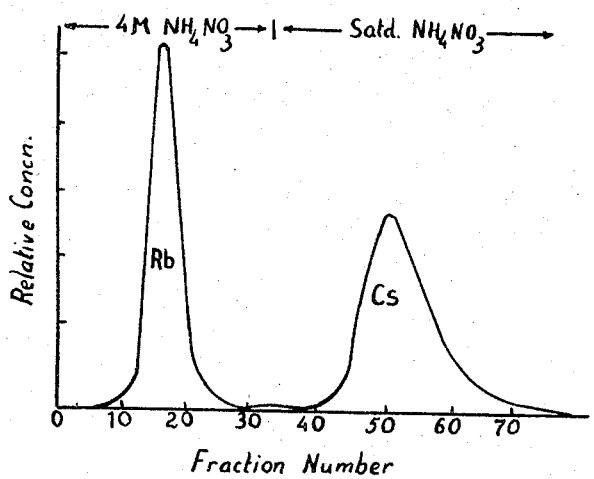

April 25, 1967    J. VAN ROUENDAL SMIT    3,316,066
PROCESS FOR SELECTIVELY SEPARATING CESIUM CATIONS
Filed Sept. 19, 1963

3,316,066
PROCESS FOR SELECTIVELY SEPARATING
CESIUM CATIONS
Jakob van Rouendal Smit, 27 22nd St., Menlo Park,
Pretoria, Transvaal, Republic of South Africa
Filed Sept. 19, 1963, Ser. No. 310,974
Claims priority, application Republic of South Africa,
Apr. 3, 1958, 1,157/58
10 Claims. (Cl. 23—338)

This is a continuation-in-part of my application Ser. No. 795,391, filed Feb. 25, 1959, now abandoned.

The present invention relates to a process for selectively separating cesium cations from aqueous solutions of fission products.

In the reprocessing of uranium or other nuclear fuels of atomic piles it is periodically required to remove so-called nuclear poisons, i.e. fission product nuclides of high neutron affinity formed in the fission process. The fuel elements are normally dissolved in nitric acid and the unspent fuel is recovered by solvent extraction. The remaining highly radioactive nitric acid solution, generally referred to as "fission product waste," presents considerable disposal problems. However, some of the constituents of this "waste" can be put to practical use if recovered at sufficiently low cost in adequate purity.

A particularly valuable "waste" constituent is cesium 137, which, because of its comparatively long half-life of about 33 years and the nature of its radioactivity, is a gamma radiation source of great potential for industrial and other purposes. An economic process of recovery of the cesium from such waste solutions would not only make available a useful product, but would also serve to substantially decrease the radiation level of waste product solutions by removing the most important long-lived gamma emitter and would thereby facilitate their further handling and storage.

Organic ion exchange resins are unsuitable for recovering cesium from these solutions owing to their inadequate selectivity and their liability to physical breakdown and loss of capacity when exposed to large doses of ionizing radiation. Some inorganic ion exchangers, e.g. zirconium phosphate, have recently been proposed for the purpose but have been found unsatisfactory as regards selectivity and capacity. The process to be described in the present specification has proved itself to be superior to existing methods.

Some ion exchange properties of ammonium phosphomolybdate have been known qualitatively for many years. A recent study (D. Meier and W. E. Treadwell, Helv. Chim. Acta, 1951, vol. 34, pages 155 to 168) reports the adsorption of cesium, rubidium and potassium by ammonium phosphomolybdate when solutions of these salts are reacted separately with this solid, the specifically stated object being to find conditions under which these alkali ions can be separated from one another by precipitation of their phosphomolybdates. The experiments were carried out under essentially neutral conditions, the pH as a result of undesirable degradation reactions sometimes dropping slightly below 6.0 but never lower than 5.0.

Meier and Treadwell in the above publication observe only insignificant differences in the degree of exchange of the alkali ions cesium, rubidium and potassium, and they conclude, in conformity with the findings of previous investigations, that what little selectivity there may be is of no practical use for the separation of alkali metal cations from one another.

For modern ion exchange processes it is furthermore essential that the exchange is dynamically reversible and that all exchangeable ions are freely accessible to enable the exchange equilibrium to be rapidly established for both directions of the reaction. However, Meier and Treadwell, page 166, line 2 ff., conclude from their experiments: "The rapidly proceeding saturation of the surface (of the ammonium phosphomolybdate particles—translator's note) is followed by a slowly proceeding exchange with the interior of the sediment particles during which the supply of ammonium ions of the particles is far from exhausted. It appears to us that an approximately linear concentration gradient of alkali ions is established which falls off towards the interior of the particles." Such properties are exactly the opposite of those required for a substance suitable for use in an ion exchange process.

It is an object of the invention to provide an efficient ion exchange process for the separation of cesium, in particular cesium 137, from mixtures containing same, in particular highly radioactive solutions of fission products.

It is a further object to provide an ion exchange process as referred to above which is carried out with an ion exchanger unaffected by radiation, such as the radiation occurring in the radioactive solutions referred to.

It is another object of the invention to provide an ion exchange process of the type referred to suitable for treating strongly acid solutions, more particularly solutions so strongly acid as to render the use of conventional organic ion exchangers impracticable.

It is a further object of the invention to make possible the use of a particular group of ion exchanging substances in the form of porous ion exchanger beds which substances had previously only been known in a form unsuitable for making beds allowing rapid large scale percolation therethrough.

A process in accordance with the invention for selectively separating cesium cations from an aqueous solution of mixed fission products including cesium 137 comprises: percolating the aqueous solution through a bed of an ion exchanger comprising as its ion exchanging constituent a solid heteropolyacid salt of which the cationic part is at least partly composed of ammonium radicals and of which the anionic part comprises:

(i) a co-ordinating radical selected from the group consisting of molybdate and tungstate radicals, and
(ii) a hetero-radical selected from the group consisting of phosphate and arsenate radicals, thereby loading the bed with cesium; percolating through the bed at least one further aqueous liquid essentially inert to the anionic part of the ion exchanger to remove from the bed at least the bulk of all impurities previously retained while retaining at least part of the cesium absorbed by the bed; maintaining a pH below 6.0 in all aqueous liquids throughout their percolation through the bed, at least one of the said aqueous liquids having a pH not exceeding 2.7 during its percolation through the entire bed; and recovering a concentrated cesium product from the bed.

The process is based on applicant's extensive investigations, which, inter alia, brought to light the following combination of discoveries:

(a) The ion exchanging substances defined in the preceding paragraph have an exceedingly high selectivity for cesium cations even when cesium is present in aqueous solution containing other cations capable of competing for exchange positions on the ion exchanger. These include rubidium. When cesium and rubidium are present together, the two substances can be separated from one another by means of the said ion exchanger.

(b) The only metal cation capable of competing with cesium on an approximately equal footing under all conditions is monovalent thallium. However, monovalent thallium is easily oxidised to the non-competing trivalent form. Moreover, thallium is normally absent from fission product solutions;

(c) Besides the alkali metal cations heavier than sodium, and silver ions, monovalent mercury ions and monovalent thallium ions, a very large number of di- and multivalent metal cations are exchangeable as well, including many which are present in fission product solutions. Examples are the cations of strontium, barium, yttrium and the rare earth metals. Under certain conditions (pH 3.5) the exchangeability of yttrium, for example, is of the same order of magnitude as that of cesium. However, applicant has discovered that the absorbability of di- and multivalent cations, in contrast to those of cesium and other alkali metal ions, is strongly pH dependent and is largely repressed at a pH of 2.7 or less. At a pH below 2.0 the adsorbability of such ions is suppressed virtually completely and in strongly acid solutions such as solutions having a pH below 1.0 these ions are not adsorbed at all regardless of the concentration in which they may be present.

(d) Contrary to the observations of Meier and Treadwell equilibrium between the solution and the entire ion exchanger particles is rapidly attained, the exchange process being reversible and almost instantaneous in both directions.

(e) Although ammonium phosphomolybdate and related substances had hitherto only been known in the form of particles of extreme fineness as are obtained by reacting the acid of the co-ordinating radical with the acid of the hetero-radical in the presence of an ammonium salt in an acid aqueous medium, which form is normally quite unsuitable for preparing an ion exchange bed allowing rapid percolation rates, ways and means have been devised to overcome this problem, as will be explained further below.

A pH below 6.0 is maintained from the outset and at all times in accordance with the process in order to avoid or inhibit degradation of the ion exchanging substances. Such degradation is suppressed virtually completely if a pH is maintained below 5.0 throughout the process, which pH therefore constitutes a preferred upper limit.

To suppress the retention of di- and multivalent cations by the ion exchanger bed from the outset, the starting solution is preferably maintained at a pH not exceeding 2.7, preferably below 2.0, more preferably below 1.0, throughout its percolation through the bed. Where necessary the pH may be lowered to the required extent by the addition of mineral acid, e.g. hydrochloric acid, nitric acid or sulphuric acid. Buffer substances may be employed to maintain a specific pH although this is normally not necessary.

As an alternative to the above or in combination with the above, di- and multivalent cations retained by the bed as impurities of the cesium, may be washed off the column by percolating therethrough an aqueous washing solution having a pH not exceeding 2.7, preferably below 2.0, more particularly an aqueous solution of a mineral acid, e.g. hydrochloric acid or nitric acid or sulphuric acid.

Rubidium is normally also present in fission product solutions and will at least partly be adsorbed by the ion exchanger bed together with the cesium. If the ion exchanger bed is saturated with cesium the bulk of the rubidium will be removed, together with some cesium, by mere washing with mineral acid. Alternatively, and particularly when the ion exchanger bed is not saturated with cesium, rubidium can be selectively eluted off the ion exchanger bed by percolating therethrough an aqueous solution of an ammonium salt having a pH below 6.0, preferably below 5.0, more particularly an ammonium salt of a mineral acid, e.g. ammonuim nitrate, ammonium chloride, or the like, in such concentrations that the bulk of the cesium is retained by the ion exchanger bed. A suitable eluent may, for example, be between 1 and 6 normal in respect of ammonium ions and is preferably between 1 and 4 normal, say 4 normal, in respect of ammonuim ions.

Fractional elution of the ion exchanger bed (as described in great detail in the said application Ser. No. 795,391) may be resorted to in order to recover any one or more substances besides cesium in purified or concentrated form if it is desired to separate these substances for any purpose whatsoever. For example, barium 137 is continuously formed as a daughter element of cesium 137, even while the latter is retained by the ion exchanger. After all other impurities have been washed out barium will still be formed and can then be washed off the column with an acid wash liquid to serve as a very useful source of pure gamma radiation.

Because of the ion exchangers' stability in strongly acid solutions, the ion exchanger bed may be loaded by directly percolating therethrough a strongly acid fission product waste solution essentially in the form in which it is obtained after dissolution of spent nuclear fuel in nitric acid and after recovery from the resulting nitric acid solution of the unspent residue of the fuel by solvent extraction. If desired, but not necessarily, the bulk of the nitric acid may be recovered in a known manner from the solution prior to its being percolated through the bed.

The process is conveniently carried out with the ion exchanger bed packed in a column of the type commonly used for chromatographic processes. In such cases it is essential that the process steps described above are preceded by the step of preparing a porous column bed. One difficulty which is generally encountered when working with the specified salts of heteropolyacid is presented by the extreme fineness of these substances in the form in which they are normally obtained, which makes them quite unsuitable for immediate use in columns for practically useful separation processes. It has been found that various measures may be taken to improve the porosity of the ion exchanger bed to the required extent. The ion exchanger may be brought into a granular or pelleted form with a suitable binder, e.g. silica gel. A suitable granular form of the ion exchanger ready for packing into porous columns may also be prepared entirely without a binder. A process for producing such an ion exchanger is described in my pending application Ser. No. 184,497 filed Apr. 2, 1962, now Patent No. 3,243,258.

In accordance with an alternative embodiment the column bed with the required porosity may be formed as an essentially uniform mixture of the said solid heteropolyacid salt and a fibrous carrier substance, of which asbestos fibres have been found particularly satisfactory. It has been discovered surprisingly that such beds formed from mere physical mixtures of asbestos and the said source of heteropolyacid are quite stable and, against expectation, do not demix in use. For reasons not fully understood, the ion exchanger particles adhere to the asbestos fibres. For example, the column packing material may be prepared by mixing the ion exchanger substance and fibrous carrier in the desired proportion, e.g. obtained by weighing or measuring, and slurrying them with an aqueous liquid inert to the anionic part of the ion exchanger, e.g. with a dilute solution of an ammonium salt having a pH below 6.0, preferably below 5.0. The best ratio of active substance to carrier depends on the desired flow rate. Ratios between 1:10 and 4:1 by weight are suitable.

It has been found that by any one of the above-mentioned alternatives column beds are formed with the required porosity for rendering the process practical, namely, a porosity allowing a percolation rate of at least 0.3 ml. per minute when measured in an unpressurized vertical cylindrical column of 0.9 cm. uniform diameter, a column height of at least 1.9 cm. and aqueous liquid at least covering the top of the column bed.

For recovering a concentrated cesium product from the ion exchanger bed after removal of the impurities therefrom, the ion exchanger may either be decomposed, more particularly by dissolving the bed in alkaline aqueous solution, whereafter the cesium is separated from the resulting solution; or alternatively the cesium is eluted from the bed by percolating therethrough an aqueous solution having a pH below 6.0 and containing a high concentration of ammonium ions, and subsequently recovering the cesium from the resulting solution. In accordance with the first alternative mentioned above, the solution resulting from the dissolution of the ion exchanger bed, e.g. in ammonia, is preferably subjected to a further ion exchange processing step for the specific purpose of separating cesium from the remaining ions in the solution, including those resulting from the dissolution of the ion exchanger. An anion exchanger (e.g. a suitable organic resin, for instance in the hydroxide cycle) may be used, whereby molybdate or tungstate and phosphate or arsenate are adsorbed by exchange for hydroxide or similar ions, the ammonium ions as well as the extracted cesium passing through as the hydroxide or like salts. The effluent may then be evaporated to dryness, ammonia or ammonium salts being removed by evaporation or sublimation or in other known manners.

As a further alternative, the solution resulting from the dissolution of the ion exchanger bed in aqueous caustic soda, after neutralisation to a pH of about 4.0, may be percolated through a zirconium phosphate column bed in the sodium cycle, whereby the cesium ions are preferentially retained on the column bed by exchange for sodium ions. After eluting residual sodium ions from the column bed with dilute mineral acid solution, e.g. 0.1 M HCl, the cesium may be recovered by eluting with strong mineral acid solution, e.g. 3 M HCl, and evaporating the effluent to remove the acid.

When cesium is removed from the ion exchanger bed used for the main purification step by elution therefrom (which leaves the ion exchanger bed intact) the eluent is preferably a concentrated aqueous solution of ammonium nitrate. The ammonium nitrate in the solution may be removed by decomposition with aqua regia, or by treatment with alkyl acid anhydride, e.g. acetic anhydride (cf. U.S. Patent No. 2,838,368).

Constituents of fission product solutions which tend to complicate the process in accordance with the invention in its various modificatons are zirconium and niobium. These two elements behave somewhat abnormally, being partly present in a form which passes through the ion exchanger bed without being retained, while another form thereof is retained by the column, being only partly removed during treatment of the column to displace other impurities. When the ion exchanger bed is dissolved in alkaline aqueous solution as described above, the zirconium and niobium are obtained as a precipitate which may be removed by filtration.

All four substances falling within the definition of the above-specified ion exchanging substance are suitable for the process. Ammonium phosphomolybdate and ammonium phosphotungstate are particularly suitable in practice and of these again I prefer to use ammonium phosphomolybdate. Ammonium phosphomolybdate is the most readily available of the substances for large scale use and can be obtained at a reasonable price.

Figure 2:
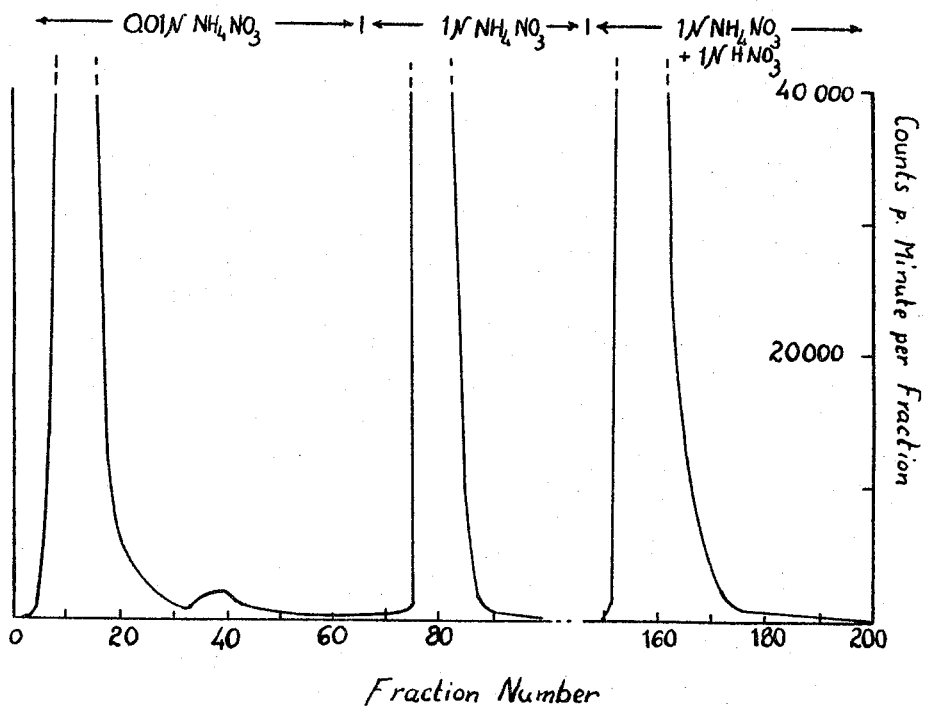

Without prejudice to the generality of the aforegoing, the invention and some manners in which it may be put into practice and other aspects will in the following be further described by way of example, partly with reference to the drawings, in which:

FIG. 1 represents a graphical representation of the chromatographic separation of rubidium from cesium; and FIG. 2 represents a graphical representation of the chromatographic separation of fission products from one another.

EXAMPLE 1

Distribution coefficient

In the following the separation potentialities of ammonium phosphomolybdate (APM), ammonium phosphotungstate (APW), ammonium arsenotungstate (AAW) and ammonium arsenomolybdate (AAM) are compared with those of conventional cation exchangers by reference to the distribution coefficient ($K_d$) for various cations in 0.1 M ammonium nitrate solution. "Dowex 50" (registered trademark, Dow Chemical Company) in the ammonium form was used for comparison as an example of a typical commercial organic ion exchange resin. Values for $K_d$ (defined as amount of X per g. of ion exchanger divided by the amount of X per ml. solution, at equilibrium, where X is the ionic species in question) were obtained by agitating overnight weighed quantities of the air-dried ion exchanger with a measured volume of the ammonium nitrate solution containing a trace amount of X, and determining the concentration of X before and after equilibration.

The following results were obtained:

[Distribution Coefficients, $K_d$ in 0.1 M $NH_4NO_3$]

|  | Cs (I) | Rb (I) | K (I) | Na (I) | Tl (I) | Ag (I) | Sr (II) | Y (III) |
|---|---|---|---|---|---|---|---|---|
| "Dowex 50" | 62 | 52 | 46 | 26 |  |  |  |  |
| APM | 6,000 | 190 | 3-5 | ~0 | 5,000 | 30 | >20 | 5,300 |
| APW | 4,050 |  |  |  |  |  |  |  |
| AAW | 202 |  |  |  |  |  |  |  |
| AAM | 4,150 | 187 | 5.5 | ~0 |  |  |  |  |

The $K_d$ values of thallium were determined with thallium in its monovalent form. It was found that thallium, when oxidised to the trivalent form, was not exchanged at all at a pH below 2.0 and only to a very minor extent at a pH below 2.7.

$K_d$ values of strontium and yttrium were determined at a pH of 2.7 and 3.5, respectively, kept constant by using sodium acetate buffers. For strontium it was found that raising the pH above 2.7 resulted in an increase in $K_d$, and for both substances it was found that lowering the pH below 2.7 resulted in rapid decrease of $K_d$ and below pH 2.0 there was no measurable ion exchange.

The exchange capacities of the novel ion exchangers for cesium were of the order of 0.7 milliequivalent per gram, which compares favourably with those of conventional organic cation exchangers.

EXAMPLE 2

Chromatographic separation of alkali metals

A small quantity of ammonium phosphomolybdate was packed in a glass column 5 mm. in diameter to give a bed only 1.6 mm. high. Two drops of a solution containing trace amounts of radioactive Na, K, Rb, and Cs salts were added to the top of the column. Using a column head 11 cm. high, elution was carried out with solutions of ammonium nitrate of different concentrations. The initial flow rate was about one drop per minute. Drops of the effluent were collected and their radioactivity measured. A complete separation was obtained. Similar separations have been achieved with organic cation exchange resins, but in this case it was necessary to use columns 250 times longer than the present one.

The experiment shows that cesium can be separated completely from all alkali metal ions occurring in fission product solutions. The cations were eluted from the column bed in the sequence sodium, potassium, rubidium, caesium with 0.01 M, 0.2 M, 3.0 M and saturated ammonium nitrate solutions, respectively. The results were completely reproducible when the experiment was repeated on a larger scale.

EXAMPLE 3

Separation of cesium and rubidium 1 g. of ammonium phosphomolybdate was mixed as a slurry in water with about an equal weight of asbestos and packed in a column to a height of about 8 cm. (total volume of bed about 7 ml.). The bed appeared visually to be quite uniform in ammonium phosphomolybdate content. A 5 ml. solution containing 10 mg. each of tagged Cs and Rb was added to the top of the column and allowed to seep in. Elution at a flow rate of 1 ml./min. was then carried out with the effluent indicated in FIG. 1 and eluent fractions analysed for radioactivity. The elution curve given in FIG. 1 shows a very satisfactory separation.

The flow rate was limited to about 1 drop/3 seconds but the maximum flow rate of the column with a liquid head of 5 cm. was considerably higher and the flow rate had to be regulated by using a rubber tube and a screw clamp. There is therefore no doubt that satisfactory flow rates may be obtained in this way and that the process may be stepped up for application on an industrial scale.

This conclusion was confirmed by large scale experiment.

EXAMPLE 4

Repetition of Examples 2 and 3 with APW, AAW and AAM

A repetition of the experiments with the above-mentioned substances resulted in findings completely analogous with the results of the experiment of Example 2.

EXAMPLE 5

Radiation stability

Samples of APM, AAW, APW, and AAM were exposed for one week to intense neutron and gamma radiation in a nuclear reactor. The radiation resulted in no noticeable deterioration of the ion exchange properties of the substances.

EXAMPLE 6

Flow rates

Ammonium phosphomolybdate and asbestos were weighed into beakers to give the ratios as stated in the table below. 10 ml. of a dilute $NH_4NO_3$ solution was then added, the contents thoroughly mixed by stirring and swirling and then transferred to the column. The same column (diameter 0.9 cm.), together with a wad of glass wool as support, was used in each run.

The APM-asbestos was left to pack and the liquid to drain completely. The column was then filled to the top with 0.1 M $NH_4NO_3$ solution, and while measuring the flow rate (expressed as ml. of effluent per minute) the column was maintained completely full by continual additions of water (12 cm. head).

| | | | | |
|---|---|---|---|---|
| Weight APM, g | 0.025 | 0.25 | 0.40 | 0.60 |
| Weight asbestos, g | 0.25 | 0.25 | 0.20 | 0.15 |
| Ratio APM/asbestos (by weight) | 1:10 | 1:1 | 2:1 | 4:1 |
| Length of column bed, cm | 3 | 3 | 2.1 | 1.9 |
| Flow rate in ml./min | 3.9 | 1.6 | 0.7 | 0.3 |

In all cases the beds appeared visually to be quite uniform in ammonium phosphomolybdate content.

EXAMPLE 7

Separation of fission products on ammonium phosphomolybdate

For this experiment an 18-month-old fission product solution was used, which should have contained only the following fission products in significant amounts (half-lives are given in parentheses):

Sr (26 years)
Cs (33 years)
Ru (1 year)
Zr–Nb (65 days)
Tc ($2 \times 10^5$ years)
Sb (2.7 years)
Ce (280 days)
Pm (2.6 years)
Y (61 days)
Sm (73 years)
Eu (1.7 years)

(Some of these have short-lived daughters. Those in the second column are rare earths, with yttrium a pseudo-rare earth.)

Of these the bulk of the Zr–Nb activity had probably decayed away, while the contribution to the total activity by technetium, owing to its very long half-life, was probably very small.

A 1:1 mixture by weight of APM-asbestos was packed into a polythene column to obtain a bed with dimensions 0.61 cm.² x 5.0 cm. After successively conditioning the column with 1 M and 0.01 M ammonium nitrate solution, 0.5 ml. of a 2% sodium acetate buffer (ph approx. 4.5) was added to the top of the column bed, followed in close succession by the addition of one drop of fission product solution (containing about 200 μc. per drop in dilute nitric acid) and 0.5 ml. of the buffer solution. The solution was allowed to seep in; elution was then carried out as shown in FIG. 2. Five-drop fractions of the effluent were collected and the radioactivity was counted after allowing at least half an hour after collection for decay of any separated short-lived $Ba^{137}$.

As may be seen from FIG. 2, a large portion of the activity passed through unadsorbed. The combined fractions 10, 11 and 12 were identified as containing $Ru^{106}$ and $Zr^{95}$–$Nb^{95}$. The appearance of a small peak identified as $Ru^{106}$ after the first peak was reproduced in duplicate experiments.

Elution of the column with 1 M $NH_4NO_3$ produced a large, well-defined peak, consisting mainly of $Sr^{90}$.

Further elution of the column with an acid ammonium nitrate eluent (1 M $NH_4NO_3$+1 M $HNO_3$) produced another peak much larger in size than any of the earlier peaks and was identified as mainly due to the rare earths.

Subsequent examination of the column showed that more than 80% of the residual activity was found in the top half of the column with the lower one-tenth containing less than 1% of the total activity on the column. Gamma spectro of the different sections showed that only an insignificant portion of the activity of the lower section was due to cesium 137.

In a second similar experiment the strongly retained cesium activity was eluted from the column with saturated ammonium nitrate solution (see Example 3) and appeared in the effluent as a well-defined peak.

The same excellent separations were obtained when the experiment was carried out with synthetic mixtures of strontium, yttrium and cesium.

When cesium 137 alone is required as a product, it is of course, possible to elute all fractions preceding cesium 137 by means of an eluent such as one molar ammonium nitrate plus one molar $HNO_3$ and then eluting the cesium 137 with saturated ammonium nitrate solution.

EXAMPLE 8

Separation of barium 137 from cesium 137

Cesium 137 (half-life 33 years) has a short-lived radioactive daughter, barium 137 (half-life 2.6 min.), which accumulates as a result of the radioactive decay of the cesium and which may be periodically milked from the parent and used as a tracer. To separate the barium 137 from its parent, the mixture is percolated in aqueous solution, e.g. as the chlorides, through a column as described in Example 3 or 6. The solution should have a pH below 6.0 and preferably below 5.0. In that case both constituents of the mixture may initially be adsorbed by the column, cesium being adsorbed preferentially. The barium may then be removed quantitatively from the column by percolating an aqueous dilute mineral acid solution, e.g. 1 M $HNO_3$, through the column. Alternatively the solution to be treated is acidified from the outset to a pH below 2.0, in which case the barium passes through the column bed unadsorbed. The column should be washed with some more aqueous mineral acid if a complete separation is desired.

The cesium 137 thus retained by the column will continue to decay radioactively and the barium 137 which accumulates may be washed off the column from time to time with dilute mineral acids. The barium thus recovered is a source of pure short-lived gamma radiation.

EXAMPLE 9

*Separation of cesium from simulated fission product waste concentrate*

For this experiment a solution of the following composition, corresponding to typical fission product waste concentrate, was used:

| Fission Product Elements: | Concentration, g./l. |
| --- | --- |
| Cs | 1.000 |
| Rb | 0.13 |
| Sr | 0.35 |
| Ba | 0.36 |
| Y | 0.20 |
| La | 0.35 |
| Nd | 0.84 |
| Ce | 0.75 |
| Zr | 1.03 |

| Non-fission Elements: | |
| --- | --- |
| U | 60 |
| Fe | 30 |
| Al | 25 |
| Cr | 2 |
| Ni | 3 |

$HNO_3$ concentration: 3 molar.

The solution was spiked by addition of 10 ml. of a solution containing 2 millicuries of 18-month-old mixed fission product activity.

The first column bed consisted of 22 ml. of 40–60 B.S. mesh APM (prepared according to method described in my afore-mentioned pending application Ser. No. 184,497), packed in a jacketed glass column to give a bed of dimensions 3.5 $cm.^2$ × 6.3 cm. Water at a temperature of 60° C. was circulated through the jacket during the experiment. Of the above solution, 2750 ml. were percolated through the column at a linear flow rate of 2.5 cm./min. and this was followed by washing the column with 100 ml. of 1 M $HNO_3$. Analysis of effluent samples showed that breakthrough of cesium occurred at about 1000 ml. and that about 65 percent of all the cesium had been retained by the column.

The column was now dissolved in 70 ml. of 5 M NaOH solution and boiled to expel ammonia. The zirconium precipitate, which weighed 0.117 g. when dried, was filtered off and washed with 10 ml. of 0.1 M NaOH. To the combined filtrate and washings were added 100 ml. of saturated oxalic acid, followed by 12 ml. of concentrated nitric acid to give a final pH of 3.7. The solution was then diluted to 350 ml.

A 22-ml. column bed of zirconium phosphate ion exchanger in the hydrogen cycle, from an experimental production batch by British Drug Houses Ltd., was packed in a jacketed column, similar but smaller than that used for the first column bed, to give a bed of dimensions 2.16 $cm.^2$ × 10.3 cm. Water at a temperature of 40° C. was circulated through the jacket during the experiment. The ion exchanger was partially converted to the sodium cycle by passing through 45 ml. of 1 M $NaNO_3$ solution. The solution obtained by the dissolution of the first column was now percolated through the zirconium phosphate bed at a linear flow rate of 1 cm./min. More than 99.9 percent of the cesium was retained by the bed. After washing with 100 ml. of water, the co-adsorbed sodium, accompanied by 1.2 percent of the cesium, was eluted with 330 ml. of 0.1 M HCl. The cesium was stripped from the column by elution with 265 ml. of 3 M HCl. The solution was evaporated to dryness to yield solid cesium chloride, contaminated by about 4.4 percent by weight of sodium chloride and less than 1 percent of rubidium chloride. About 5.8 percent of the cesium remainer behind on the column.

EXAMPLE 10

*Recovery of cesium from loaded ammonium phosphomolybdate by elution with ammonium nitrate solution*

In this experiment the cesium was recovered from the column of ammonium phosphomolybdate, after loading and washing with 1 M $HNO_3$, exactly as in Example 9, by elution at 90° C. with a 5 M ammonium nitrate solution in concentrated nitric acid at a linear flow rate of 1 cm./min. More than 95 percent of the cesium was displaced by 270 ml. (12 column volumes) of this eluent. Cesium salt essentially free from ammonium nitrate was recovered from the effluent by adding 10 ml. of concentrated hydrochloric acid, heating the mixture under reflux for one hour, and evaporating to dryness.

What I claim is:

1. A process for selectively separating cesium cations from an aqueous solution of fission products containing cesium 137 and impurities, which process comprises:

percolating the aqueous solution through a bed of an ion exchanger comprising as its ion exchanging constitutent a solid heteropolyacid salt of which the cationic part is at least partly composed of ammonium radicals and of which the anionic part comprises:

(i) a co-ordinating radical selected from the group consisting of molybdate and tungstate radical, and (ii) a hetero-radical selected from the group consisting of phosphate and arsenate radicals, thereby loading the bed with cesium;

percolating through the bed at least one further aqueous liquid essentially inert to the anionic part of the ion exchanger to remove at least the bulk of all impurities previously retained by the bed from the bed while retaining at least part of the cesium adsorbed by the bed;

maintaining a pH below 6.0 in all aqueous liquids throughout their percolation through the bed, at least one of the said aqueous liquids having a pH not exceeding 2.7 during its percolation through the entire bed; and recovering a concentrated cesium product from the bed.

2. A process as claimed in claim 1, in which at least one aqueous liquid having a pH below 2.0 is percolated through the bed, said liquid being inert to the anionic part of the ion exchanger.

3. A process as claimed in claim 1 in which all aqueous liquids percolated through the bed have a pH below 5.0.

4. A process as claimed in claim 1 in which the bed is loaded by percolating therethrough a strongly acid fission product waste solution essentially in the form in which it is obtained after dissolution of spent nuclear fuel in nitric acid and recovery of the unspent residue of the fuel by solvent extraction.

5. A process for selectively separating cesium cations from an aqueous solution of fission products containing cesium 137 and impurities which process comprises:

preparing a porous column bed, comprising an ion exchanger which in turn comprises as its ion exchanging constituent a solid heteropolyacid salt of which the cationic part is at least partly composed of ammonium radicals and of which the anionic part comprises (i) a co-ordinating radical selected from the group consisting of molybdate and tungstate radicals, and (ii) a hetero-radical selected from the group consisting of phosphate and arsenate radicals;

percolating through the column bed the said aqueous solution of fission products, thereby loading the bed with cesium;

percolating through the bed at least one further aqueous liquid essentially inert to the anionic part of the ion exchanger to remove at least the bulk of all impurities previously retained by the column bed from the column bed while retaining at least part of the cesium adsorbed by the column bed;

maintaining a pH below 6.0 in all aqueous liquids throughout their percolation through the bed, at least one of the said aqueous liquids having a pH not exceeding 2.7 during its percolation through the entire bed;

and recovering a concentrated cesium product from the bed.

6. A process as claimed in claim 5 in which the column bed is formed with a porosity allowing a percolation rate of at least 0.3 mm. per min. when measured in an unpressurised vertical cylindrical column of 0.9 cm. uniform diameter, a column height of at least 1.9 cm. and aqueous liquid at least covering the top of the column bed.

7. A process as claimed in claim 6 in which the column bed is formed as an essentially uniform mixture of the solid heteropolyacid salt and asbestos fibres.

8. A process for selectively separating cesium cations from an aqueous solution of fission products containing cesium 137 and impurities which process comprises:

percolating the aqueous solution through a bed of an ion exchanger comprising as its ion exchanging constituent a solid heteropolyacid salt of which the cationic part is at least partly composed of ammonium radicals and of which the anionic part comprises:

(i) a co-ordinating radical selected from the group consisting of molybdate and tungstate radicals, and (ii) a hetero-radical selected from the group consisting of phosphate and arsenate radicals;

percolating through the bed at least one further aqueous liquid essentially inert to the anionic part of the ion exchanger to remove at least the bulk of all impurities previously retained by the bed from the bed while retaining at least part of the cesium adsorbed by the bed;

maintaining a pH below 6.0 in all aforementioned aqueous liquids throughout their percolation through the bed, at least one of the said aqueous liquids having a pH not exceeding 2.7 during its percolation through the entire bed;

dissolving the said solid heteropolyacid salt together with the retained cesium in an aqueous alkaline liquid; and recovering a concentrated cesium product from the resulting solution.

9. A process as claimed in claim 8 in which the solution resulting from the dissolution of the ion exchanger is percolated through a different ion exchanger for separating the cesium from other constituents of the solution.

10. A process for selectively separating cesium cations from an aqueous solution of fission products containing cesium 137 and impurities which process comprises:

percolating the aqueous solution through a bed of an ion exchanger comprising as its ion exchanging constituent a solid heteropolyacid salt of which the cationic part is at least partly composed of ammonium radicals and of which the anionic part comprises:

(i) a co-ordinating radical selected from the group consisting of molybdate and tungstate radicals, and (ii) a hetero-radical selected from the group consisting of phosphate and arsenate radicals, thereby loading the bed with cesium;

percolating through the bed at least one further aqueous liquid essentially inert to the anionic part of the ion exchanger to remove at least the bulk of all impurities previously retained by the bed from the bed while retaining at least part of the cesium adsorbed by the bed;

maintaining a pH below 6.0 in all aqueous liquids throughout their percolation through the bed, at least one of the said aqueous liquids having a pH not exceeding 2.7 during its percolation through the entire bed;

eluting the cesium previously retained from the bed by percolating through the bed an aqueous solution of ammonium nitrate having a pH below 6.0;

decomposing the latter ammonium nitrate with aqua regia;

and evaporating the resulting aqua regia decomposition product to dryness to recover a concentrated purified cesium product.

References Cited by the Examiner

UNITED STATES PATENTS 2,798,850   7/1957   Voightman et al. ____ 210—36 X

OTHER REFERENCES

Meier et al.: Helv. Chim. Acta, 1951, vol. 34, pp. 155–168.

CARL D. QUARFORTH, Primary Examiner.

BENJAMIN R. PADGETT, Examiner.

S. TRAUB, Assistant Examiner.